US008107107B2

(12) United States Patent
Tomita et al.

(10) Patent No.: US 8,107,107 B2
(45) Date of Patent: Jan. 31, 2012

(54) FACSIMILE APPARATUS, FACSIMILE COMMUNICATION METHOD, AND FACSIMILE COMMUNICATION SYSTEM FOR PREVENTING ERRONEOUS TRANSMISSION

(75) Inventors: Hisanori Tomita, Kyoto (JP); Shinji Kawasaki, Kyoto (JP)

(73) Assignee: Murata Kikai Kabushiki Kaisha, Kyoto-shi, Kyoto (JP)

( * ) Notice: Subject to any disclaimer, the term of this patent is extended or adjusted under 35 U.S.C. 154(b) by 1297 days.

(21) Appl. No.: 11/785,792

(22) Filed: Apr. 20, 2007

(65) Prior Publication Data
US 2007/0247670 A1    Oct. 25, 2007

(30) Foreign Application Priority Data
Apr. 25, 2006  (JP) .................. 2006-121160

(51) Int. Cl.
*G06F 3/12* (2006.01)
*H04N 1/00* (2006.01)

(52) U.S. Cl. ................... 358/1.15; 358/440

(58) Field of Classification Search .......... 358/1.1, 358/1.15, 402, 403, 407, 437, 440, 474, 500, 358/531; 399/8, 79, 80
See application file for complete search history.

(56) References Cited

U.S. PATENT DOCUMENTS
6,879,411  B1     4/2005  Otsuka et al.
7,526,212  B2 *  4/2009  Zwiefelhofer ........... 358/1.15
2002/0069212  A1 *  6/2002  Leonardos ............. 707/200
2006/0007484  A1 *  1/2006  Tanimoto .............. 358/1.15
2006/0044621  A1 *  3/2006  Ohhata et al. ......... 358/438
2006/0139679  A1 *  6/2006  Barry et al. ........... 358/1.13

FOREIGN PATENT DOCUMENTS
JP  11-215291 A    8/1999
JP  2002-232663 A  8/2002
JP  2002-247273 A  8/2002
JP  2005-217797 A  8/2005
JP  2005-227839 A  8/2005
JP  2005-268922 A  9/2005
JP  2006-74345 A   3/2006

OTHER PUBLICATIONS
Japanese Office Action dated Jun. 8, 2010, issued in corresponding Japanese Patent Application No. 2006-121160.

* cited by examiner

*Primary Examiner* — Gabriel Garcia
(74) *Attorney, Agent, or Firm* — Westerman, Hattori, Daniels & Adrian, LLP (57) ABSTRACT

A facsimile apparatus is provided, which can access a latest database associating facsimile numbers and destination names. The apparatus includes a storage unit for storing a destination table in which button information such as one-touch dial buttons, facsimile numbers, and destination names are associated, an input unit for accepting an instruction for one-touch facsimile transmission, a facsimile number acquisition unit for identifying a destination name associated with the transmission instruction by referring to the destination table and searching the database using the destination name as a search key to acquire a facsimile number associated therewith, and a transmission unit for determining whether the acquired facsimile number agrees with a facsimile number associated with a one-touch dial button accepted by the input unit and executing facsimile transmission only when the numbers agree.

14 Claims, 9 Drawing Sheets

| DESTINATION NAME | FACSIMILE NUMBER | ELECTRONIC MAIL ADDRESS |
|---|---|---|
| ... | ... | ... |
| XX CORPORATION | 06-1234-5678 | info@xxx.co.jp |
| YY CORPORATION | 03-5678-9012 | mail@yyy.com |
| SALES DEPT, ZZ CORPORATION | 03-7890-1234 | office@zzz.co.jp |
| ... | ... | ... |

| BUTTON INFORMATION | DESTINATION NAME | FACSIMILE NUMBER | ELECTRONIC MAIL ADDRESS |
|---|---|---|---|
| ... | ... | ... | ... |
| ONE-TOUCH B | AB CORPORATION | 06-9876-5432 | — |
| ONE-TOUCH C | YY CORPORATION | 03-5678-9012 | mail@yyy.co.jp |
| ... | ... | ... | ... |
| ABBREVIATED 003 | DD LIMITED COMPANY | 06-2345-6789 | abc@ddd.com |
| ABBREVIATED 004 | EE TRADING COMPANY | 06-4567-8901 | xyz@eee.co.jp |
| ... | ... | ... | ... |

FACSIMILE APPARATUS, FACSIMILE COMMUNICATION METHOD, AND FACSIMILE COMMUNICATION SYSTEM FOR PREVENTING ERRONEOUS TRANSMISSION

BACKGROUND OF THE INVENTION

1. Field of the Invention

The present invention relates to a facsimile apparatus, a facsimile communication method, and a facsimile communication system and, more particularly, to a facsimile apparatus, a facsimile communication method, and a facsimile communication system having a function of preventing erroneous transmission that is facsimile transmission to a wrong destination.

2. Description of the Related Art

One approach for the prevention of erroneous transmission or facsimile transmission to a wrong destination is to perform transmission using one-touch or abbreviated dialing while prohibiting transmission through direct input of a facsimile number. One-touch dialing is a function which involves pre-registration of particular telephone numbers in association with several buttons and which allows connection to a facsimile number pre-registered in association with one button to be automatically established when the button is pressed. Abbreviated dialing is a function which involves pre-registration of particular facsimile numbers in association with respective two- or three-digit numbers, and the function allows the telephone numbers to be dialed using the two- or three-digit numbers instead of about ten figures which are otherwise to be dialed. When such an approach is adopted, facsimile transmission can be made only to pre-registered facsimile numbers, and erroneous transmission attributable to an input error in directly inputting a facsimile number can be avoided.

Even when such an approach is adopted, it is not possible to avoid erroneous transmission attributable to an error in making registration for one-touch or abbreviated dialing and erroneous transmission attributable to an unknown change in the telephone number of the party to be called.

Under these circumstances, proposals have been made to introduce a facsimile apparatus which has periodic access to a database having the latest and correct information registered therein to automatically update the dial information stored in the apparatus in order to keep the dial information registered for one-touch and abbreviated dialing updated and correct. What is intended is to avoid erroneous transmission attributable to an error in making registration for one-touch or abbreviated dialing and erroneous transmission attributable to an unknown change in the telephone number of the party to be called.

However, although the above-described facsimile apparatus has periodic access to the database, a problem still arises in that erroneous transmission can take place depending on timing of transmission immediately after the facsimile number of the party to be called is changed. Specifically, dial information registered for one-touch or abbreviated dialing is not necessarily updated immediately after the facsimile number of a party to be called is changed. Therefore, when facsimile transmission to the party is attempted using one-touch or abbreviated dialing, the facsimile transmission may be made to the old facsimile number.

The invention has been made taking such a situation into consideration, and it is an object of the invention to provide a facsimile apparatus which allows facsimile transmission to be made to a correct party by preventing erroneous transmission even when transmission is made immediately after the facsimile number of the party to be called is changed.

SUMMARY OF THE INVENTION

In order to achieve the above-described object, the invention provides a facsimile apparatus which is connected through a communication network to a database device holding a latest database in which facsimile numbers and destination names are associated. The facsimile apparatus includes destination table storing means, input means, facsimile number acquisition means, and transmission means. The destination table storing means stores a destination table in which button information identifying a one-touch or abbreviated dial button, a facsimile number, and a destination name are associated. The input means accepts an instruction for facsimile transmission using a one-touch or abbreviated dial button. The facsimile number acquisition means refers to the button information and the destination names in the destination table to identify a destination name associated with the one-touch or abbreviated dial accepted by the input means and searches the database held by the database device using the destination name thus identified as a search key to acquire a facsimile number associated with the destination name. The transmission means determines whether the facsimile number acquired by the facsimile number acquisition means agrees with a facsimile number in the destination table associated with the one-touch or abbreviated dial button accepted by the input means and which executes facsimile transmission to the facsimile number when it is determined that the numbers agree.

Thus, when facsimile transmission using one-touch or abbreviated dialing is instructed, it is determined whether the facsimile number registered for the one-touch or abbreviated dial button is the latest number, and transmission takes place only if the number is determined to be the latest number. It is therefore possible to make facsimile transmission to a correct destination without an error even if the transmission is executed immediately after the facsimile number of the party to be called is changed.

The facsimile apparatus may further include registration means which registers a new destination entry in the destination table. When the input of new button information and a new destination name is accepted, the registration means may search the database held by the database device using the destination name thus accepted as a search key to acquire a facsimile number associated with the destination name and may associate the facsimile number thus acquired with the button information and the destination name to register them in the destination table as a new destination entry. Thus, when registration for one-touch or abbreviated dialing is made, a destination name is input instead of inputting a facsimile number directly, and a facsimile number acquired from the latest database using the destination name as a search key is automatically registered. It is therefore possible to avoid any error in making registration for one-touch dialing or abbreviated dialing attributable to direct input of a facsimile number.

Preferably, the facsimile apparatus further includes a prohibition means which prohibits transmission from being made by directly inputting a facsimile number. Thus, erroneous transmission attributable to direct input of a facsimile number can be avoided.

The database may further include electronic mail addresses in association with the facsimile numbers and the destination names. The destination table may further include electronic mail addresses in association with the button information, the facsimile numbers and the destination names. The facsimile number acquisition means may search the database to acquire an electronic mail address associated with the destination name along with the facsimile number. The transmission means may determine whether the facsimile number and electronic mail address acquired by the facsimile number acquisition means agree with a facsimile number and an electronic mail address associated with the one-touch or abbreviated dial button accepted by the input means, respectively, and may execute facsimile transmission to the facsimile number when it is determined that the numbers agree. The facsimile numbers are determined identical when not only the destination names but also the electronic mail addresses agree with each other as thus described. Thus, the destination of transmission is reliably identified to allow effective verification of transmission.

The facsimile apparatus may further include registration means which registers a new entry in the destination table. When the input of new button information and a new destination name is accepted, the registration means may search the database held by the database device using the destination name thus accepted as a search key to acquire a facsimile number and an electronic mail address associated with the destination name and may associate the facsimile number and the electronic mail address thus acquired with the button information and the destination name to register them in the destination table as a new destination entry. As a result, not only the facsimile number but also the electronic mail address can be automatically registered to be used as a destination address for facsimile transmission that is executed in the form of an electronic mail.

By referring to the destination table, the transmission means may determine whether the facsimile number acquired by the facsimile number acquisition means agrees with a facsimile number associated with the one-touch or abbreviated dial button accepted by the input means and may reject facsimile transmission to the facsimile number when it is determined that they do not agree. Thus, erroneous transmission can be reliably prevented.

Notification means may be further provided to notify the user of the rejection of facsimile transmission attributable to the disagreement of the numbers when facsimile transmission is rejected by the transmission means. Thus, when facsimile transmission is rejected, the user can be notified of the reason for the rejection.

The invention makes it possible to make facsimile transmission to a correct destination without an error even when the transmission is attempted immediately after the facsimile number of the party to be called is changed.

It is possible to avoid making a nuisance of others and to avoid leakage of information because of erroneous facsimile transmission, and the invention therefore has a quite high value in practical use.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

A preferred embodiment of the present invention will be described in detail with reference to the accompanying drawings.

Figure 1:
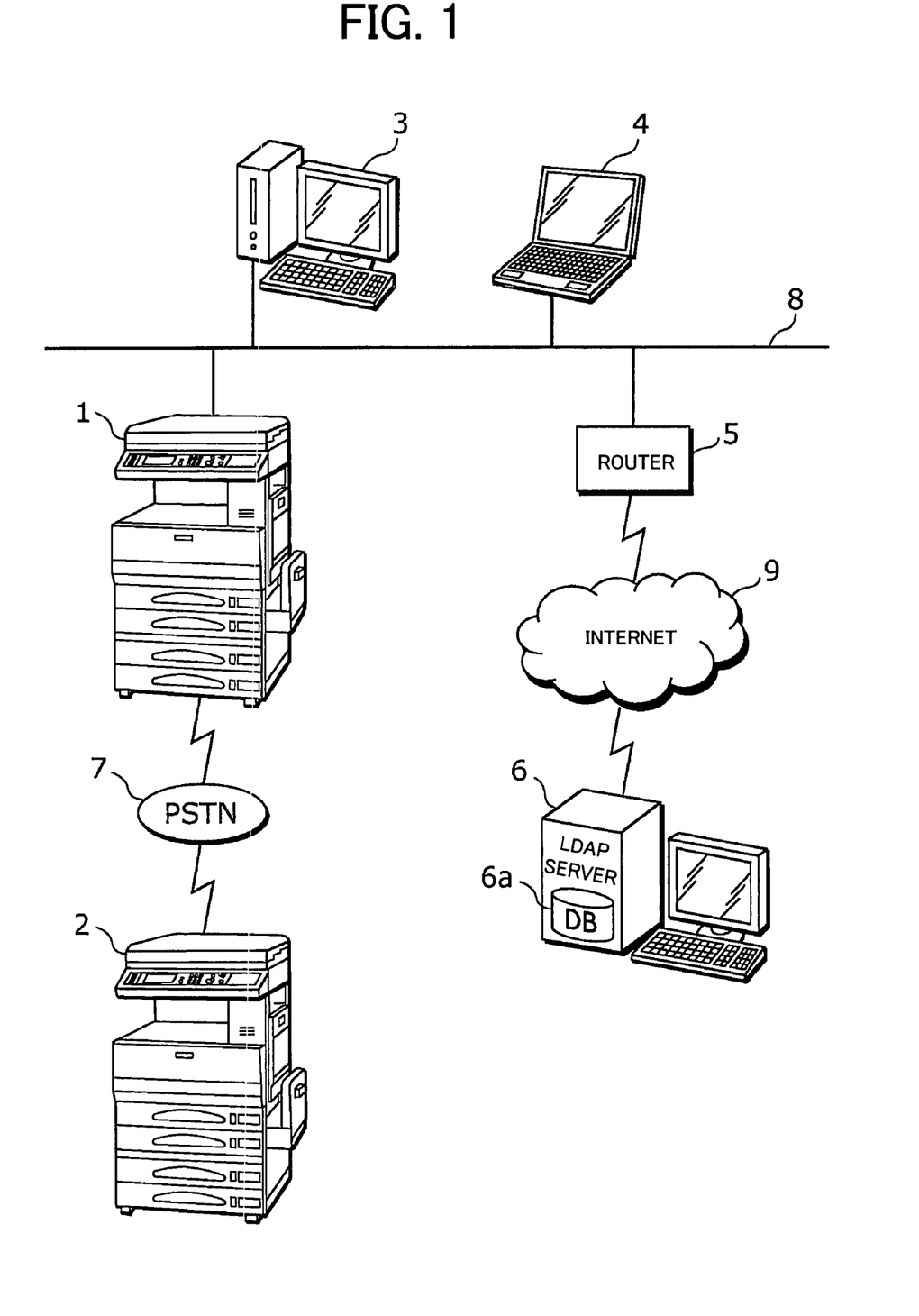
FIG. 1 illustrates a configuration of a communication system including a facsimile apparatus according to a preferred embodiment of the present invention.

FIG. 1 illustrates a configuration of a communication system including a facsimile apparatus according to a preferred embodiment of the present invention. In the communication system, a facsimile apparatus 1 according to the invention is connected to another facsimile apparatus 2 to and from which facsimile transmission and reception takes place through a PSTN (Public Switched Telephone Network) 7. The facsimile apparatus 1 is also connected to terminal units 3 and 4 and a router 5 through a LAN 8. Further, the facsimile apparatus 1 is connected to an LDAP (Lightweight Directory Access Protocol) server 6, which is an external database device, through the LAN 8, the router 5, and an internet 9.

The terminal units 3 and 4 access the facsimile apparatus 1 through the LAN 8 to give various instructions to the facsimile apparatus 1. The terminal units 3 and 4 also make various settings of the facsimile apparatus 1 by accessing it through the LAN 8. As thus described, the terminal units 3 and 4 serve as remote operation panels for the facsimile apparatus 1.

The router 5 is a router which serves as a gateway interconnecting the LAN 8 and the internet 9 serving as a WAN.

Figure 2:
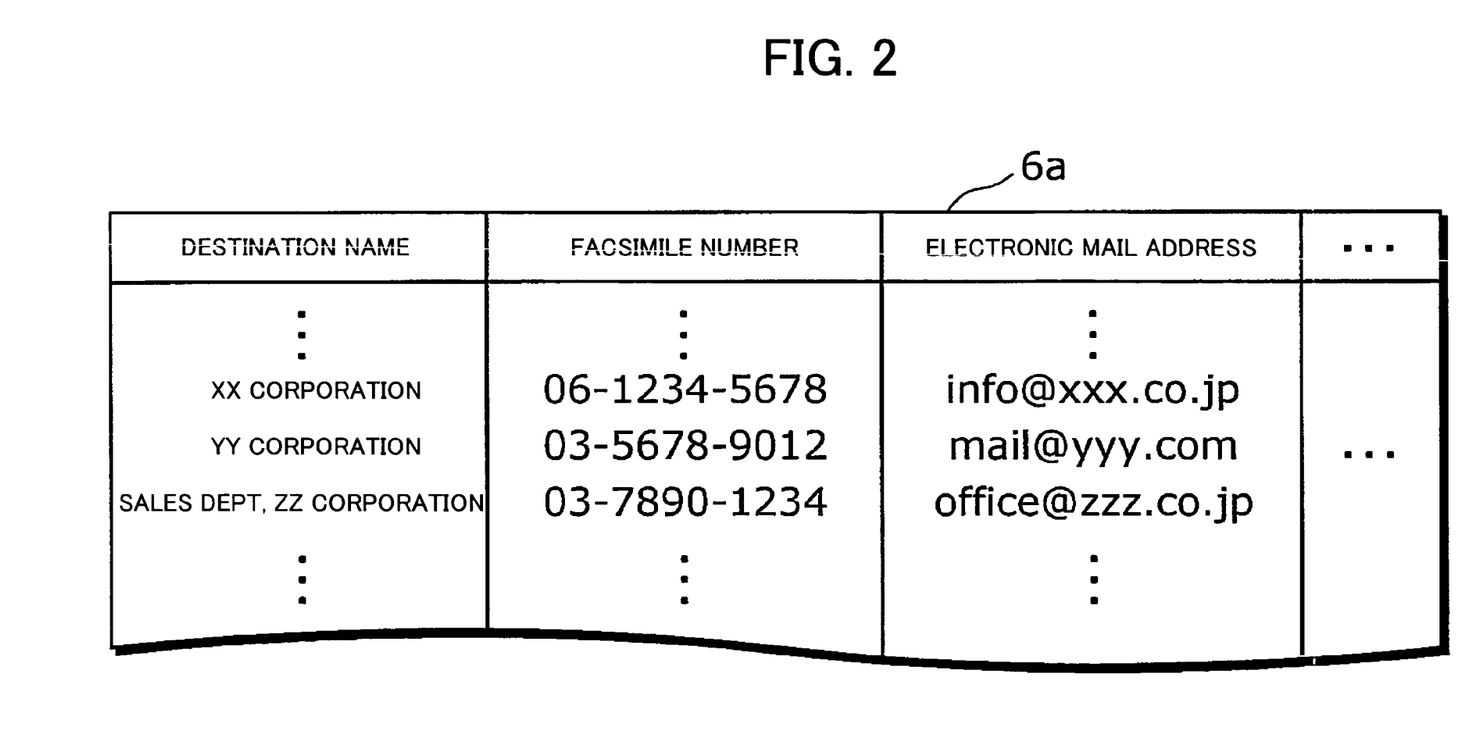
FIG. 2 illustrates an example of a configuration of a latest database held by an LDAP server.

The LDAP server 6 is a unit which provides a directory service using a protocol called LDAP. As shown in FIG. 2, the LDAP server 6 is an example of a database device holding a latest database in which users of a network are associated with various types of user information. The user information includes destination names (user names) representing destinations of facsimile transmission, facsimile numbers, and electronic mail addresses. The LDAP server 6 has a function of retrieving the various types of user information using the destination names as search keys. The term "latest database" means a database which is to be updated with latest contents, and the frequency of updates is determined case by case.

Figure 3:
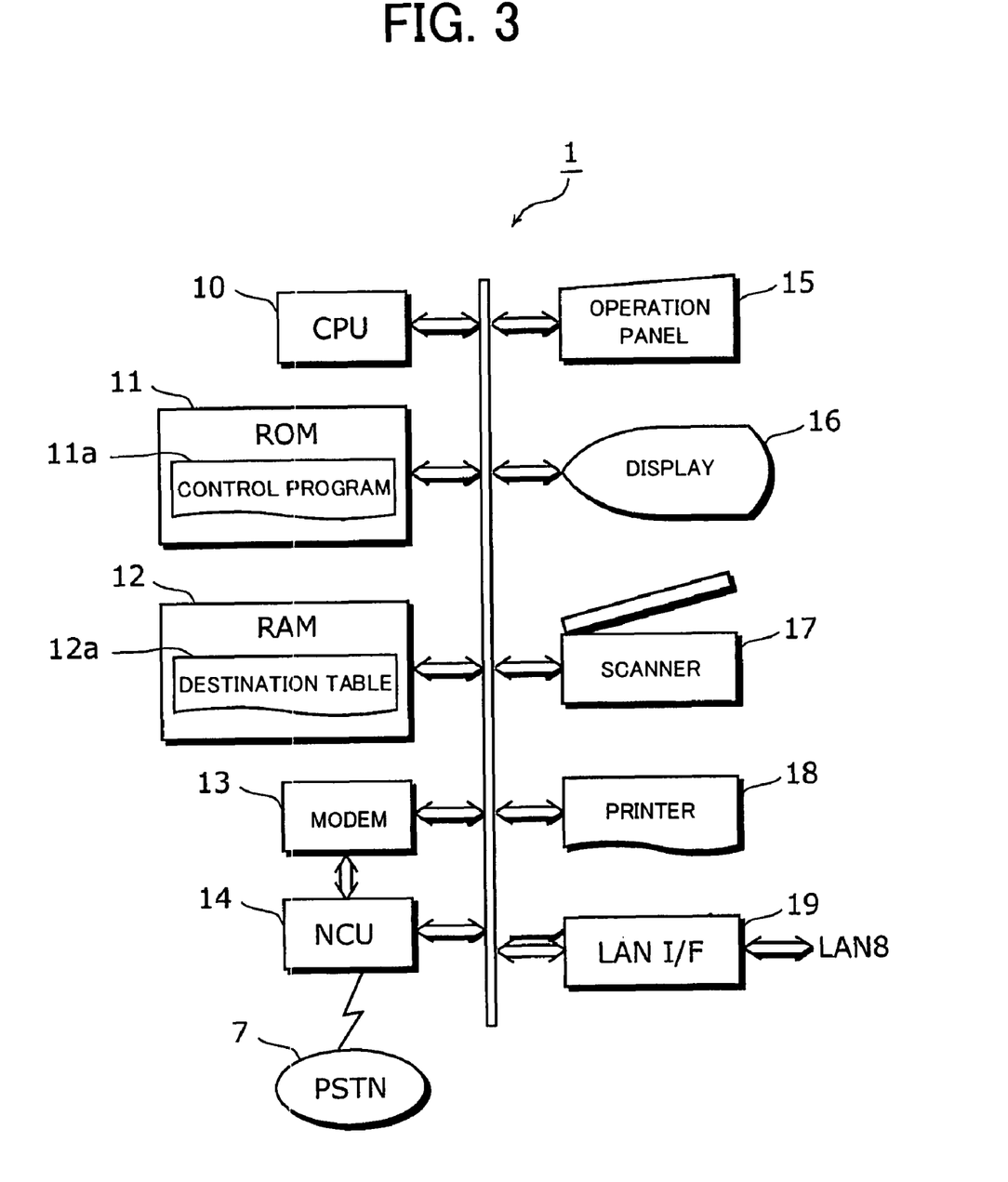
FIG. 3 illustrates a hardware configuration of the facsimile apparatus.

The facsimile apparatus 1 is an example of facsimile apparatus according to a preferred embodiment of the present invention. As will be described later, the facsimile apparatus 1 is characterized in that it has various functions for preventing erroneous transmission. For example, the facsimile apparatus 1 is an MFP (Multi-Function Peripheral). As shown in FIG. 3, the facsimile apparatus 1 has a hardware configuration including a CPU 10, a ROM 11, a RAM 12, a modem 13, an NCU (Network Control Unit) 14, an operation panel 15, a display 16, a scanner 17, a printer 18, and a LAN interface 19.

The CPU 10 is a processor which executes a control program 11a stored in the ROM 11.

The ROM 11 is a read only memory for holding the control program 11a.

Figure 4:
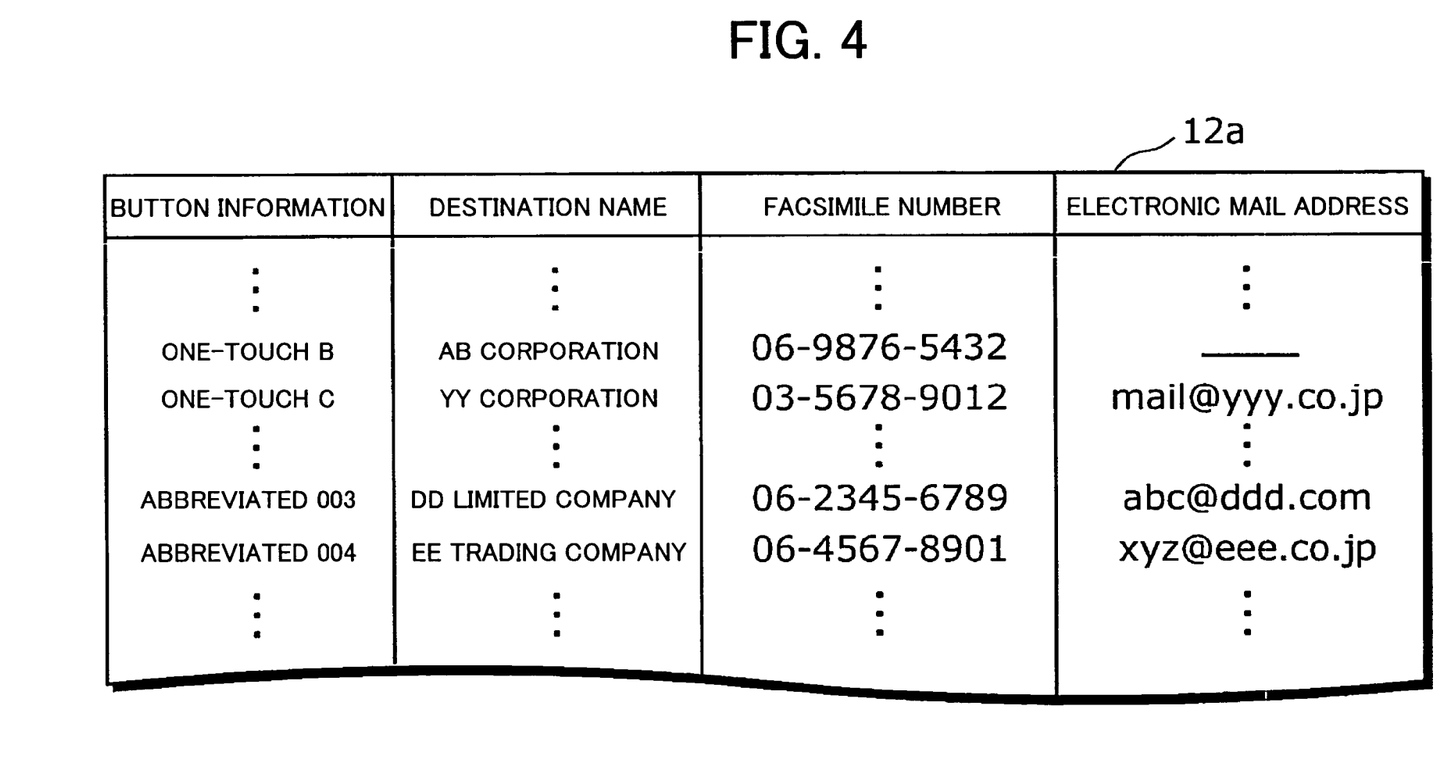
FIG. 4 illustrates an example of a configuration of a destination table held by the facsimile apparatus.

The RAM 12 is a random access memory having a work area, a first storage area that is volatile, and a second storage area that is non-volatile. The work area is used when the CPU 10 executes the control program 11a. The first storage area temporarily holds image data read by the scanner 17 and/or image data transmitted from the other facsimile apparatus 2. The second storage area holds a destination table 12a. As shown in FIG. 4, the destination table 12a is an information table for holding destination entries. In a destination entry, button information identifying a one-touch and abbreviated dial button, a destination name, a facsimile number, and an electronic mail address are associated with each other.

The modem 13 is a fax modem which modulates image data to be subjected to facsimile transmission and demodulates image data coming from outside through facsimile transmission.

The NCU 14 is a circuit terminating unit which is connected to the PSTN 7.

The operation panel 15 is a panel which accepts operations of a user. For example, the panel accepts an instruction for facsimile transmission using one-touch or abbreviated dialing.

The one-touch dialing function is a function which involves pre-registration of particular telephone numbers in association with respective ones of several buttons to allow connection to be automatically made to the facsimile number pre-registered in association with one button only by a press on the button.

The abbreviated dialing function is a function which involves pre-registration of particular facsimile numbers in association with respective two- or three-digit numbers to allow the telephone numbers to be dialed using the two- or three-digit numbers instead of about ten figures which are otherwise to be dialed.

The display 16 is a liquid crystal display device (LCD) which is used for interactions with a user and on which states of operation of the facsimile apparatus 1 are displayed.

The scanner 17 is an image reader which reads the contents of an original document with a CCD to generate image data. An original document is subjected to facsimile transmission or copied and output by a printer 18.

The printer 18 is a printing apparatus which prints and outputs, for example, the contents of image data transmitted from the other facsimile apparatus 2 through the PSTN 7, NCU 14, and the modem 13 (facsimile reception data) and/or contents read by the scanner 17.

The LAN interface 19 is a communication adapter for connecting the facsimile apparatus 1 to the LAN 8.

Figure 5:
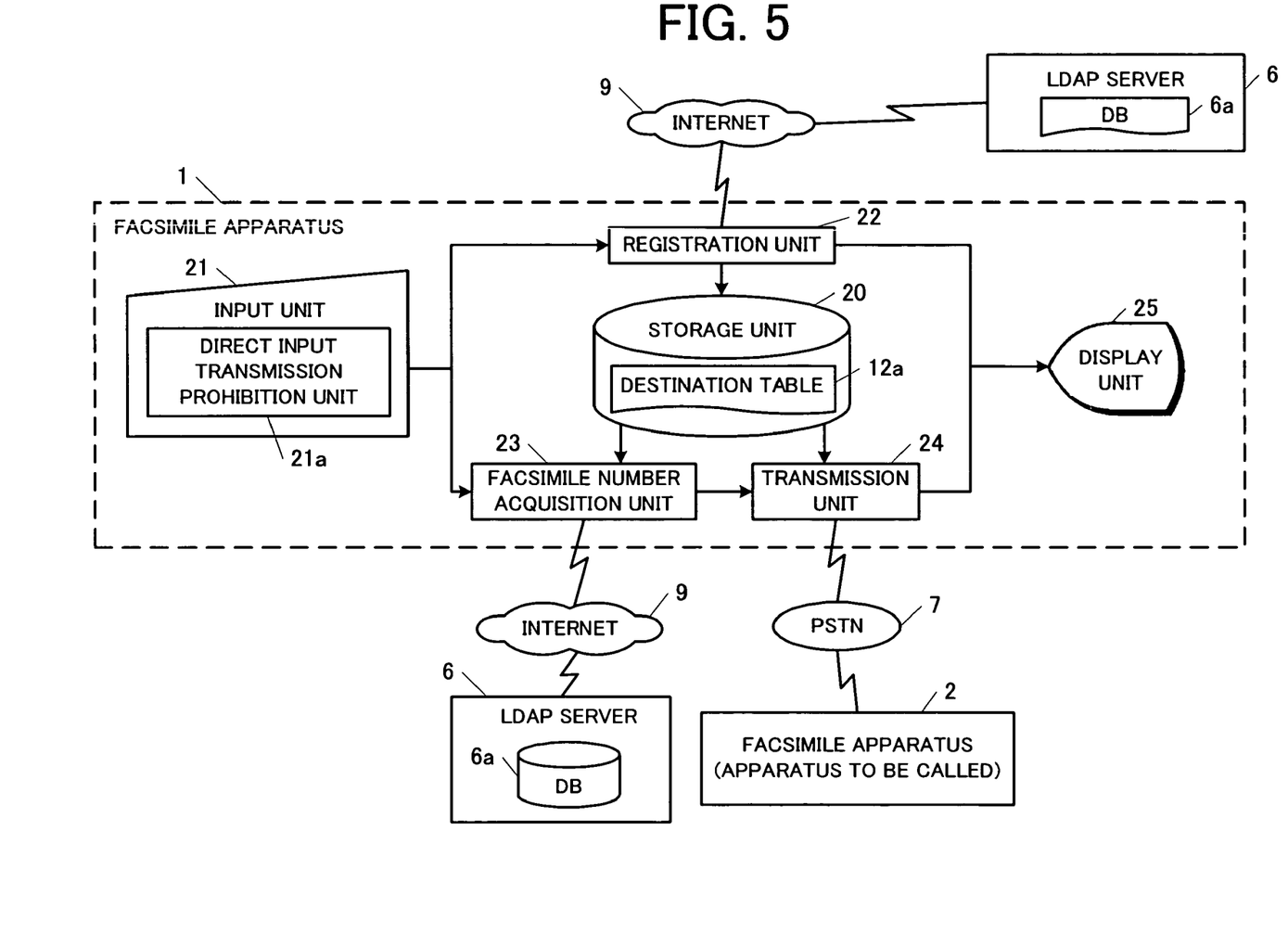
FIG. 5 illustrates a block diagram showing an example of a functional configuration characteristic of the facsimile apparatus.

FIG. 5 illustrates a diagram showing an example of a functional configuration characteristic of the facsimile apparatus 1 according to a preferred embodiment of the present invention. That is, FIG. 5 illustrates a block diagram showing functions associated with the functions of the facsimile apparatus 1 provided by the hardware configuration shown in FIG. 3.

From a functional point of view, the facsimile apparatus 1 includes a storage unit 20, an input unit 21, a registration unit 22, a facsimile number acquisition unit 23, a transmission unit 24, and a display unit 25.

The storage unit 20 corresponds to the RAM 12 in FIG. 3, and it is an example of destination table storing means for storing the destination table 12a shown in FIG. 4.

The input unit 21 corresponds to the operation panel 15 in FIG. 3, and it is an example of input means for accepting an instruction for facsimile transmission using a one-touch or abbreviated dial button. The input unit 21 has a direct input transmission prohibiting portion 21a for prohibiting transmission through direct input of a facsimile number. A user can arbitrarily make a setting on whether to prohibit transmission through direct input of a facsimile number or not using the operation panel 15. Therefore, the input unit 21 performs switching based on the setting made by the user in advance to reject or accept transmission through direct input of a facsimile number. Specifically, when a setting has been made to prohibit transmission through direct input, the input unit 21 rejects transmission through direct input of a facsimile number and accepts only instructions for facsimile transmission using one-touch or abbreviated dialing.

The registration unit 22 is a processing unit which is constituted by the CPU 10 and the control program 11a shown in FIG. 3. The registration unit 22 is an example of registration means for registering a new destination entry in the destination table 12a stored in the storage unit 20 according to an instruction accepted by the input unit 21. When the input unit 21 accepts input of a new piece of button information along with a destination name, the registration unit 22 searches the database 6a held by the LDAP server 6 through the internet 9 using the destination name as a search key based on a notice from the input unit 21. Thus, the unit acquires a facsimile number associated with the destination name, associates the acquired facsimile number with the piece of button information and the destination name, and registers them as a new destination entry in the destination table 12a.

When electronic mail addresses are registered in the database 6a, the registration unit 22 acquires a facsimile number and an electronic mail address associated with the destination name and registers the facsimile number and electronic mail address thus acquired in the destination table 12a.

The facsimile number acquisition unit 23 is a processing unit constituted by the CPU 10, the control program 11a, and the LAN interface 19 shown in FIG. 3. The facsimile number acquisition unit 23 is an example of facsimile number acquisition means. When the input unit 21 accepts an instruction for facsimile transmission using a one-touch or abbreviated dial button, the facsimile number acquisition unit 23 identifies a destination name associated with the one-touch or abbreviated dial button accepted by the input unit 21 by referring to button information and destination names stored in the storage unit 20. The input unit 21 searches the database 6a held by the LDAP server 6 through the internet 9 using the destination name thus identified as a search key to acquire a facsimile number associated with the name of the destination of transmission.

When electronic mail addresses are included in the destination table 12a, the facsimile number acquisition unit 23 acquires an electronic mail address associated with the destination name along with the facsimile number.

The transmission unit 24 is a processing unit constituted by the CPU 10, the control program 11a, the modem 13, and the NCU 14 in FIG. 3. The transmission unit 24 is an example of transmission means which determines whether the facsimile number acquired by the facsimile number acquisition unit 23 agrees with the facsimile number associated with the one-touch or abbreviated dial button accepted by the input unit 21 by referring to the destination table 12a stored in the storage unit 20 and which executes facsimile transmission to the facsimile number only when it is determined that the numbers agree with each other. The term "facsimile transmission" means a process of transmitting image data read by the scanner 17 to the other facsimile apparatus 2 through the modem 13, the NCU 14, and the PSTN 7.

When the facsimile number acquisition unit 23 has acquired a facsimile number and an electronic mail address, the transmission unit 24 determines whether the facsimile number and the electronic mail address thus acquired agree with a facsimile number and an electronic mail address associated with a one-touch or abbreviated dial button accepted by the input unit 21, respectively, by referring to the destination table 12a and executes facsimile transmission to the facsimile number only when it is determined that they agree with each other.

The display unit 25 is constituted by the CPU 10, the control program 11a, and the display 16 in FIG. 3. The display unit 25 displays the contents of the destination table 12a according to, for example, an instruction from the registration unit 22. When it is determined that a facsimile number acquired by the facsimile number acquisition unit 23 does not agree with a facsimile number associated with a one-touch or abbreviated dial button accepted by the input unit 21, the display unit 25 displays the determination result according to, for example, an instruction from the transmission unit 24.

Operations of the facsimile apparatus of the preferred embodiment having the above-described configuration will now be described.

Figure 6:
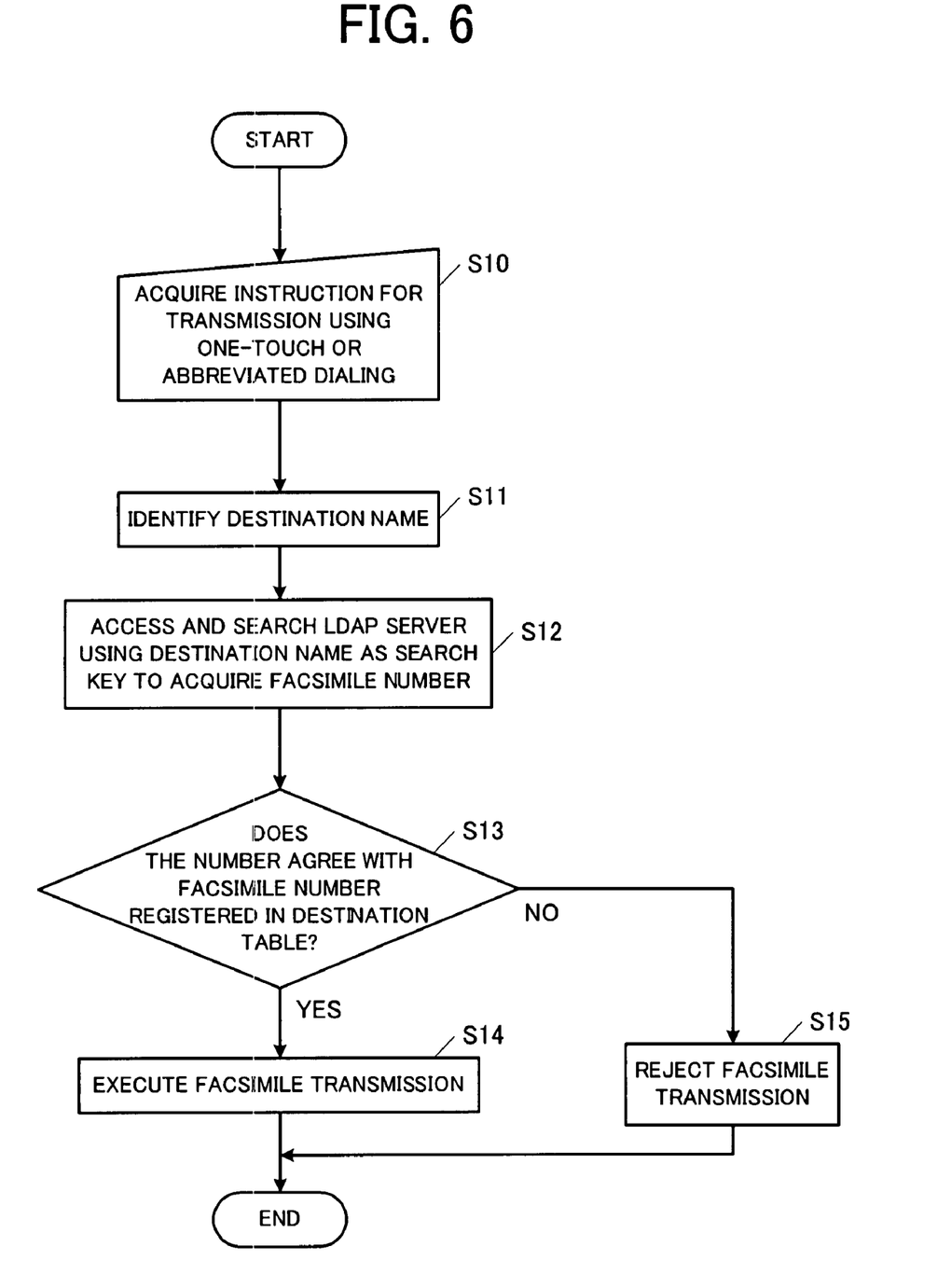
FIG. 6 is a flow chart illustration a facsimile transmission process carried out the facsimile apparatus.

FIG. 6 is a flow chart a facsimile transmission process performed by the facsimile apparatus 1.

First, the input unit 21 accepts an instruction for facsimile transmission using a one-touch or abbreviated dial button from a user (S10). For example, the user sets an original document to be facsimile-transmitted on the scanner 17, pushes a button (or buttons) for one-touch or abbreviated dialing registered in association with a party to be called, and pushes a start key thereafter.

Then, the facsimile number acquisition unit 23 identifies a destination name associated with the one-touch or abbreviated dial button accepted by the input unit 21 by referring to the destination table 12a stored in the storage unit 20 (S11) and searches the database 6a held by the LDAP server 6 using the destination name thus identified as a search key to acquire a facsimile number associated with the destination name (S12). When electronic mail addresses are included in the destination table 12a, the facsimile number acquisition unit 23 may acquire an electronic mail address associated with the destination name along with the facsimile number.

The transmission unit 24 refers to the destination table 12a stored in the storage unit 20 to determine whether the facsimile number acquired by the facsimile number acquisition unit 23 agrees with the facsimile number associated with the one-touch or abbreviated dial button accepted by the input unit 21 (i.e., the facsimile number registered in the destination table 12a) (S13). If it is determined that the facsimile numbers agree with each other (S13: YES), facsimile transmission is made to the facsimile number (S14). If it is determined that the facsimile numbers do not agree (S13: NO), facsimile transmission is rejected (S15). Information on the result of facsimile transmission, i.e., whether the facsimile transmission has been executed or rejected is displayed on the display unit 25. Specifically, when the facsimile transmission is rejected because the facsimile numbers disagree, the display unit 25 displays the fact that the facsimile transmission is rejected because of the disagreement between the facsimile numbers.

When the facsimile number acquisition unit 23 acquires a facsimile number and an electronic mail address, the transmission unit 24 may refer to the destination table 12a to determine whether the acquired facsimile number and electronic mail address agree with the facsimile number and electronic mail address associated with the one-touch or abbreviated dial button accepted by the input unit 21 (or a facsimile number and an electronic mail address registered in the destination table 12a), respectively.

Figure 7:
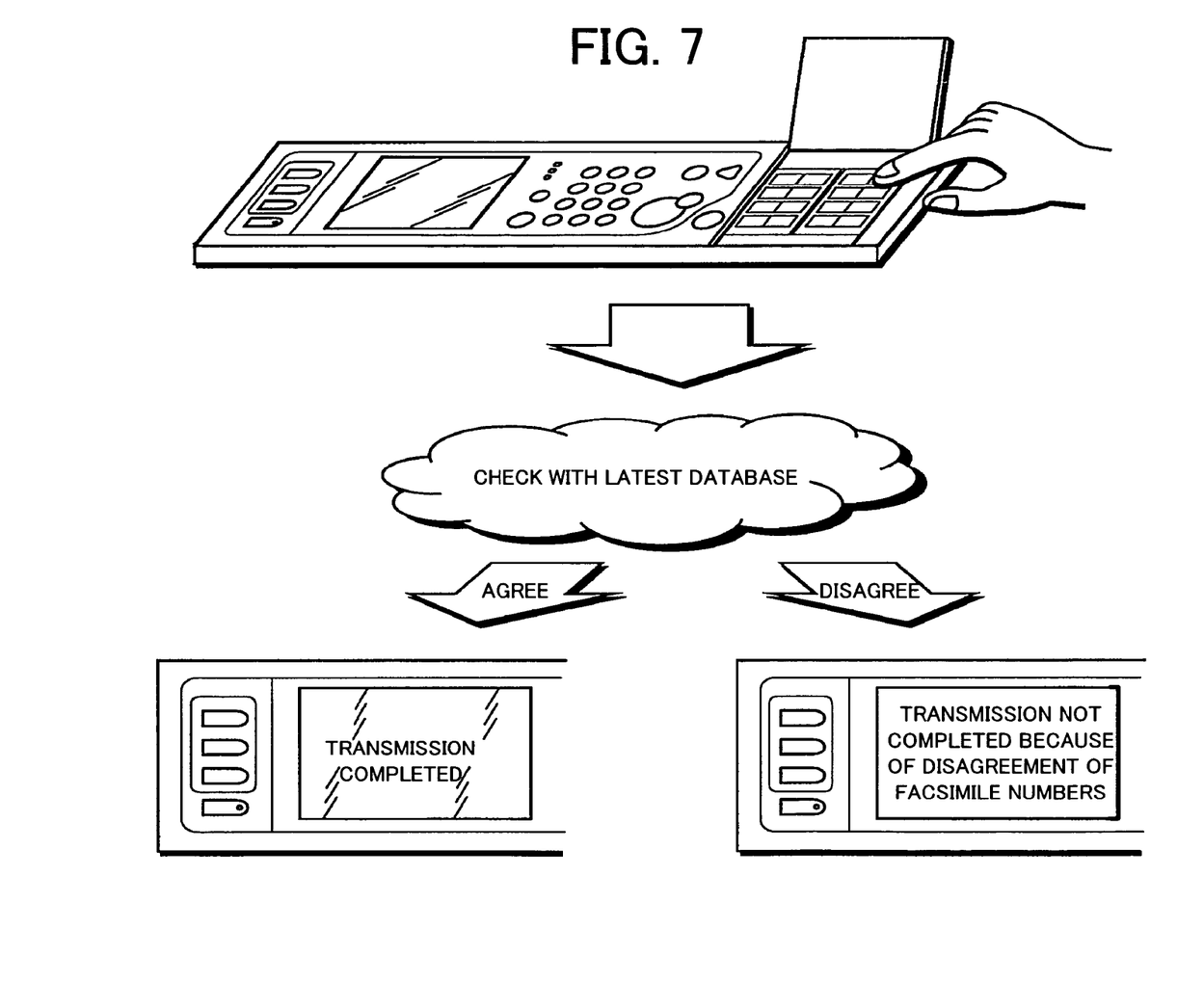
FIG. 7 illustrates an explanation of the process carried out in the flow chart of FIG. 6

In a case wherein a user instructs facsimile transmission using a one-touch or abbreviated dial button through the above-described steps as shown in FIG. 7, facsimile transmission is executed when the facsimile number registered in the destination table 12a agrees with the number registered in the latest database 6a (and a display unit 25 consequently displays that transmission has been completed). If the numbers do not agree, the facsimile transmission is rejected (the display unit 25 consequently displays that transmission has not been executed because the registered facsimile number does not agree with the latest database).

As thus described, in the preferred embodiment, transmission through direct input of a facsimile number is prohibited. When facsimile transmission using a one-touch or abbreviated dial button is instructed, it is checked immediately before the transmission whether the facsimile number registered for the one-touch or abbreviated dial button agrees with the latest number, and the facsimile transmission takes place only when they agree. It is therefore possible to avoid erroneous transmission attributable to direct input of a facsimile number and erroneous transmission which can otherwise occur immediately after the facsimile number of a party to be called is changed.

Figure 8:
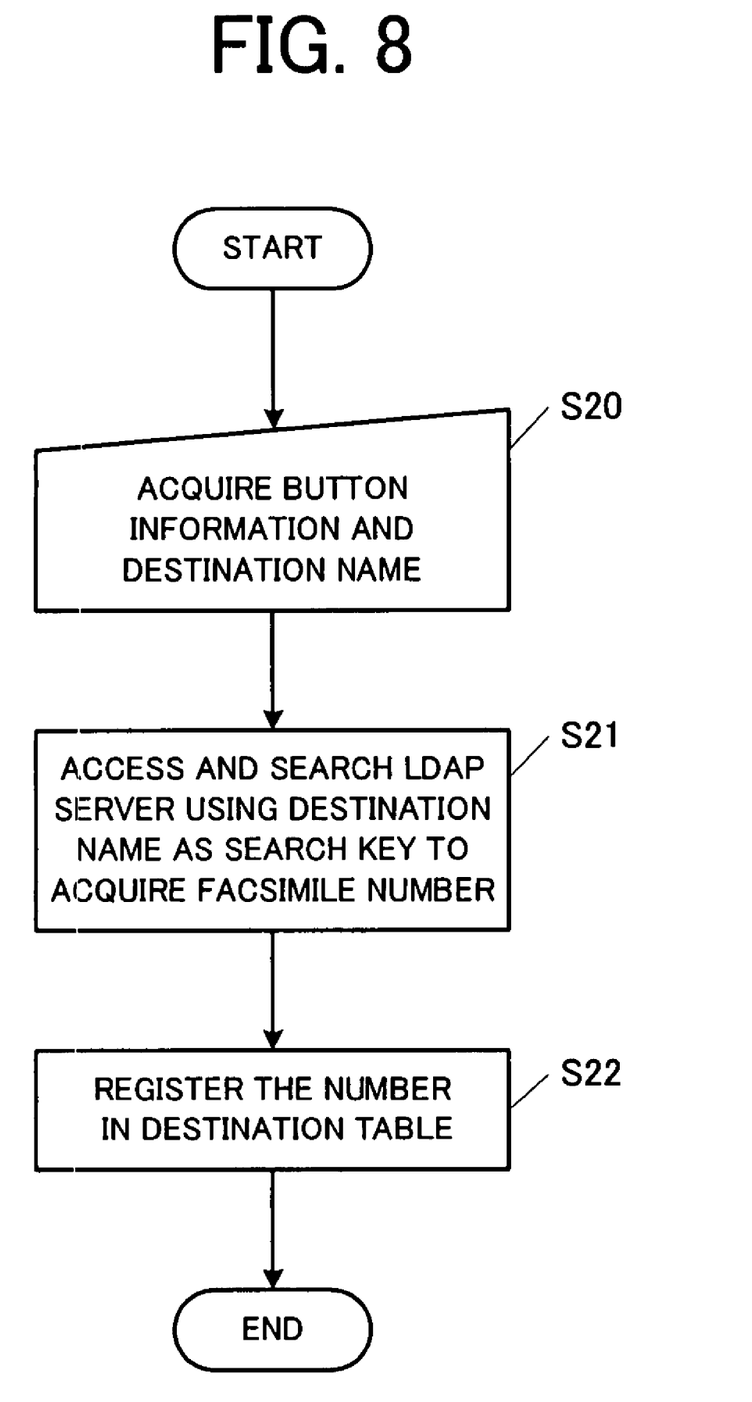
FIG. 8 is a flow chart illustrating an example of a registration process for one-touch and abbreviated dialing of the facsimile apparatus.

FIG. 8 is a flow chart illustrating a process of registering one-touch and abbreviated dial buttons at the facsimile apparatus 1. Direct input of facsimile numbers is prohibited at the facsimile apparatus 1 also in registering one-touch and abbreviated dial buttons. Therefore, a user makes registration for one-touch and abbreviated dial buttons by designating buttons to be registered as one-touch and abbreviated dial buttons and inputting the names of destinations to be registered.

When the input of new button information and a new destination name is accepted by the input unit 21 (S20), the registration unit 22 searches the database 6a held by the LDAP server 6 based on a notice from the input unit 21 using the destination name as a search key to acquire a facsimile number associated with the destination name (S21). The acquired facsimile number is associated with the button information and the destination name and registered in the destination table 12a of the storage unit 20 as a new destination entry (S22).

When electronic mail addresses are registered in the database 6a, the registration unit 22 may acquire a facsimile number and an electronic mail address associated with the destination name, and the facsimile number and electronic mail address thus acquired may be registered in the destination table 12a.

Figure 9:
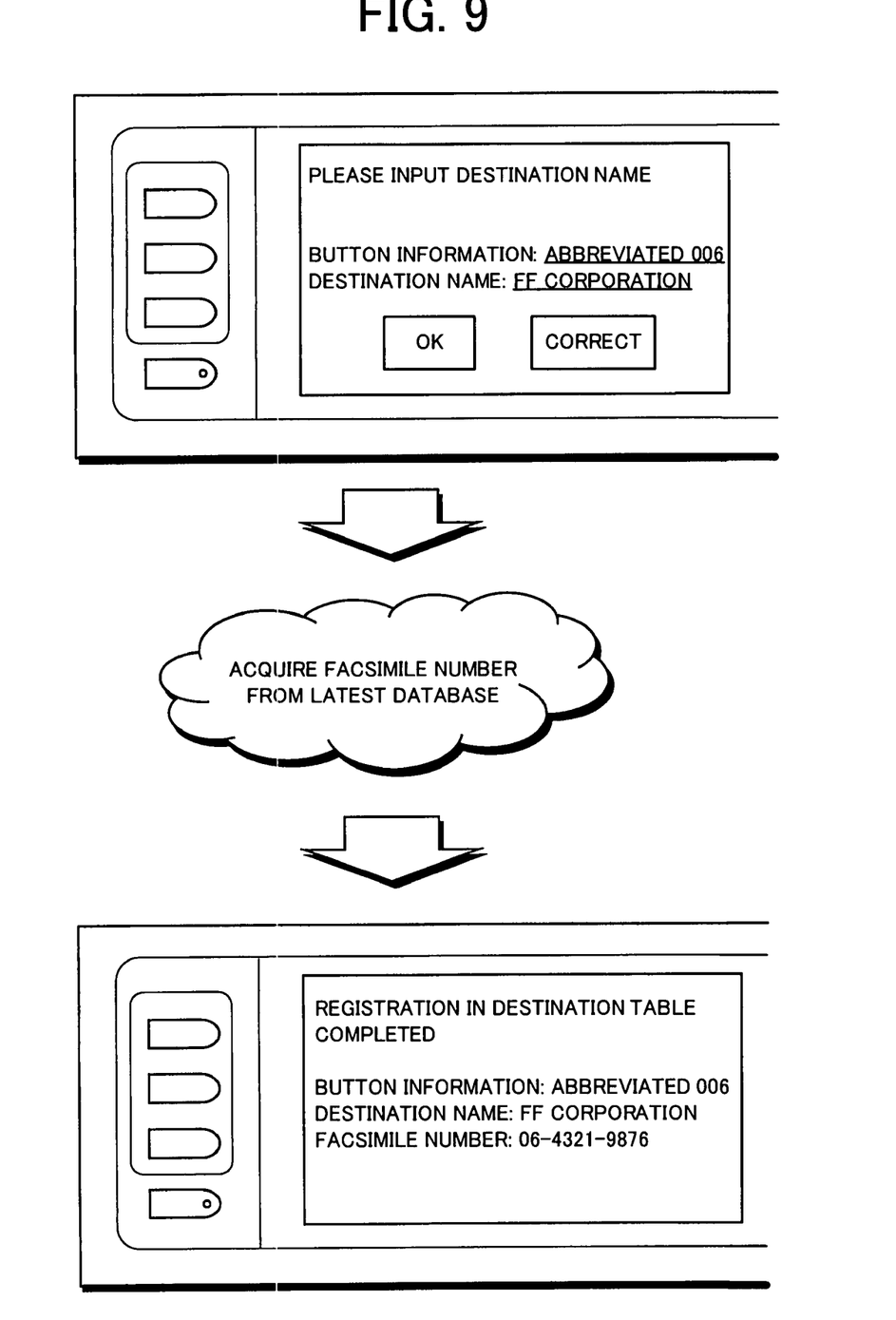
FIG. 9 illustrates an explanation of the process carried out in the flow chart of FIG. 8.

When a user inputs button information and a destination name to be registered for one-touch or abbreviated dialing as shown in FIG. 9 through the above-described steps, a facsimile number associated with the destination name is retrieved, and the facsimile number acquired through the retrieval is automatically registered in the destination table 12a along with the button information and the destination name.

As thus described, when a user registers one-touch and abbreviated dial buttons according to the preferred embodiment, the user inputs destination names instead of inputting facsimile numbers directly, and facsimile numbers acquired from the latest database using the destination names as search keys are registered. It is therefore possible to avoid any error in registering one-touch and abbreviated dial buttons which can occur when facsimile numbers are directly input, and erroneous facsimile transmission attributable to a registration error can be avoided.

As described above, the facsimile apparatus of the preferred embodiment can be summarized as follows. (1) Transmission through direct input of a facsimile number is prohibited, and only transmission using one-touch and abbreviated dial buttons is allowed. (2) When facsimile transmission using a one-touch or abbreviated dial button is instructed, it is determined immediately before the transmission whether the facsimile number registered for the one-touch or abbreviated dial button agrees with the latest number, and the facsimile transmission takes place only when they agree. (3) When registration of one-touch and abbreviated dial buttons is made, destination names are input, and facsimile numbers retrieved using the destination names as search keys are automatically registered. It is therefore possible to avoid erroneous transmission attributable to an error in inputting a facsimile number, erroneous transmission attributable to an error in registering a one-touch or abbreviated dial button, and erroneous transmission attributable to an unknown change in the facsimile number of a party to be called. Thus, facsimile transmission is reliably made to a correct destination.

While a facsimile apparatus according to the invention has been described based on a preferred embodiment of the same, the invention is not limited to the preferred embodiment.

For example, in the preferred embodiment, the LDAP server 6 is used as a database device for holding the latest database in which facsimile numbers and destination names are associated with each other. However, the invention is not limited to devices implementing such a protocol, and any database device may be used as long as it holds a database of latest information in which facsimile numbers and destination names are associated.

The registration unit 22 in the preferred embodiment acquires a facsimile number which completely agrees with an input destination name. In the case of a partial agreement, such a fact may be displayed to the user to prompt him or her to make a final decision. Specifically, in the case of a partial agreement, the fact may be displayed to the user, and an input from the user indicating whether register is required or not may be accepted. When the user inputs that registration is required, the destination name registered in the database 6a may be registered in the destination table 12a by overwriting the same.

The registration unit 22 in the preferred embodiment acquires a facsimile number of interest from a destination name only. Alternatively, a facsimile number and/or electronic mail address may be acquired from the user in addition to or instead of the destination name. The facsimile number of interest may be acquired by searching the database using all or some of the destination name, facsimile number, and electronic mail address, and the facsimile number thus acquired may be registered in the destination table 12a of the facsimile apparatus 1.

For example, the registration unit 22 may acquire a combination of a destination name and a facsimile number, a combination of a destination name and an electronic mail address, a combination of a facsimile number and an electronic mail address, or a combination of a destination name, an electronic mail address, and a facsimile number. When all items thus input agree with the database or when any of the input items agrees with the database, the facsimile number (or the destination name or electronic mail address) registered in the database 6a may be registered in the destination table 12a of the facsimile apparatus 1. In any case, since it is a method in which information registered in the latest database 6a is registered in the destination table 12a of the facsimile apparatus 1, the destination table 12a is kept updated to have latest contents, which is advantageous in preventing erroneous transmission.

The facsimile apparatus 1 of the preferred embodiment has been described as having both of the one-touch dialing function and the abbreviated dialing function, the apparatus may be provided with only one of those functions.

The invention may be advantageously used as a facsimile apparatus such as an MFP and especially as a facsimile apparatus which can prevent erroneous transmission attributable to a change in the facsimile number of a party to be called.

While the present invention has been described with respect to a preferred embodiment thereof, it will be apparent to those skilled in the art that the disclosed invention may be modified in numerous ways and may assume many embodiments other than that specifically set out and described above. Accordingly, it is intended by the appended claims to cover all modifications of the present invention that fall within the true spirit and scope of the present invention.

What is claimed is:

1. A facsimile apparatus comprising:
destination table storing means which stores a destination table in which button information identifying a one-touch or abbreviated dial button, a facsimile number, and a destination name are associated;
input means which accepts an instruction for facsimile transmission using the one-touch or abbreviated dial button;
facsimile number acquisition means which searches a database held by an external database device using a destination name associated with the one-touch or abbreviated dial button accepted by the input means as a search key to acquire a facsimile number associated with the destination name;
transmission means which determines whether the facsimile number acquired by the facsimile number acquisition means agrees with a facsimile number in the destination table associated with the one-touch or abbreviated dial button accepted by the input means and which executes facsimile transmission to the facsimile number when it is determined that the numbers agree; and
registration means which registers a new destination entry in the destination table storing means,
wherein the registration means acquires a new button information, a new facsimile number and a new destination name from a user, searches the database held by the external database device using the new facsimile number and the new destination name as a search key, and registers the new button information, the new facsimile number and the new destination name acquired from the user in the destination table as a new destination entry when the new destination name and the new facsimile number agree with the destination name and the facsimile number associated in the database.

2. A facsimile apparatus according to claim 1, wherein when the destination name accepted partially agrees with a destination name on the database, the registration means notifies a user of the fact and accepts an input from the user on whether registration is required or not.

3. A facsimile apparatus according to claim 2, wherein when the user inputs that registration is required in response to the notification to the user of the partial agreement, the registration means registers the destination name registered in the database in the destination table by overwriting the table.

4. A facsimile apparatus according to claim 1, further comprising prohibition means which prohibits transmission from being made by directly inputting a facsimile number.

5. A facsimile apparatus according to claim 4, wherein a user can arbitrarily make a setting on whether to prohibit transmission from being made by directly inputting a facsimile number.

6. A facsimile apparatus according to claim 1, wherein:
the destination table further includes an electronic mail address in association with the button information, the facsimile number, and the destination name;
the facsimile number acquisition means searches the database to acquire the electronic mail address associated with the destination name along with the facsimile number; and
the transmission means determines whether the facsimile number and the electronic mail address acquired by the facsimile number acquisition means agree with a facsimile number and an electronic mail address associated with the one-touch or abbreviated dial button accepted by the input means, respectively, and executes facsimile transmission to the facsimile number when it is determined that they agree.

7. A facsimile apparatus according to claim 1, wherein the transmission means refers to the destination table to determine whether the facsimile number acquired by the facsimile number acquisition means agrees with the facsimile number associated with the one-touch or abbreviated dial button accepted by the input means and rejects facsimile transmission to the facsimile number when it is determined that the numbers do not agree.

8. A facsimile apparatus according to claim 7, further comprising notification means which notifies the user of the rejection of facsimile transmission attributable to the disagreement of the numbers when facsimile transmission is rejected by the transmission means.

9. A facsimile communication method comprising the steps of:
an input step for accepting an instruction for facsimile transmission using a one-touch or abbreviated dial button;
an identification step for identifying a destination name by referring to button information and destination names on a destination table when the instruction for facsimile transmission is accepted at the input step;
a search step for searching a database held by an external database device using the destination name identified at the identification step as a search key;
a facsimile number acquisition step for acquiring a facsimile number associated with the destination name as a result of the search at the search step;
a determination step for determining whether the facsimile number acquired at the facsimile number acquisition step agrees with a facsimile number in the destination table associated with the one-touch or abbreviated dial button accepted at the input step;
a transmission step for executing facsimile transmission to the facsimile number when it is determined that the numbers agree at the determination step; and
a registration step for registering a new destination entry in the destination table, wherein the registration step includes:
acquiring a new button information, a new facsimile number and a new destination name from a user,
searching the database held by the external database device using the new facsimile number and the new destination name as a search key, and
registering the new button information, the new facsimile number and the new destination name acquired from the user in the destination table as a new destination entry when the new destination name and the new facsimile number agree with the destination name and the facsimile number associated in the database.

10. A facsimile communication method according to claim 9, further comprising a rejection step for rejecting the facsimile transmission to the facsimile number when it is determined that the numbers do not agree at the determination step.

11. A facsimile communication method according to claim 10, further comprising a notification step for notifying the user of the rejection of facsimile transmission attributable to the disagreement of the numbers when facsimile transmission is rejected at the transmission step.

12. A facsimile communication method according to claim 9, further comprising a prohibition step for prohibiting transmission from being made by directly inputting a facsimile number.

13. A facsimile communication system including a database device and a facsimile apparatus connected through a communication network, the database device comprising:
means for holding a latest database in which a facsimile number and a destination name are associated, the facsimile apparatus comprising:
destination table storing means which stores a destination table in which button information identifying a one-touch or abbreviated dial button, a facsimile number, and a destination name are associated;
input means which accepts an instruction for facsimile transmission using the one-touch or abbreviated dial button;
facsimile number acquisition means which searches the database held by the database device using a destination name associated with the one-touch or abbreviated dial button accepted by the input means as a search key to acquire a facsimile number associated with the destination name;
transmission means which determines whether the facsimile number acquired by the facsimile number acquisition means agrees with a facsimile number in the destination table associated with the one-touch or abbreviated dial button accepted by the input means and which executes facsimile transmission to the facsimile number when it is determined that the numbers agree; and
registration means which registers a new destination entry in the destination table storing means,
wherein the registration means acquires a new button information, a new facsimile number and a new destination name from a user, searches the database held by the external database device using the new facsimile number and the new destination name as a search key, and registers the new button information, the new facsimile number and the new destination name acquired from the user in the destination table as a new destination entry when the new destination name and the new facsimile number agree with the destination name and the facsimile number associated in the database.

14. A facsimile communication system according to claim 13, wherein:
the database further includes an electronic mail address in association with the facsimile number and the destination name;
the destination table further includes an electronic mail address in association with the button information, the facsimile number, and the destination name;

the facsimile number acquisition means searches the database to acquire the electronic mail address associated with the destination name along with the facsimile number; and the transmission means determines whether the facsimile number and the electronic mail address acquired by the facsimile number acquisition means agree with a facsimile number and an electronic mail address associated with the one-touch or abbreviated dial button accepted by the input means, respectively, and executes facsimile transmission to the facsimile number when it is determined that they agree.

* * * * *